United States Patent [19]

Cygnor

[11] Patent Number: 4,864,815
[45] Date of Patent: Sep. 12, 1989

[54] FUEL SUPPLY SYSTEM WITH TURBINE DRIVEN START PUMP

[75] Inventor: John E. Cygnor, Rochford, Ill.

[73] Assignee: Sundstrand Corporation, Rockford, Ill.

[21] Appl. No.: 137,608

[22] Filed: Dec. 24, 1987

[51] Int. Cl.[4] .............................................. F02C 7/26
[52] U.S. Cl. ................................. 60/39.141; 60/734; 417/245
[58] Field of Search ................. 60/39.141, 39.281, 734; 417/2, 245

[56] References Cited

U.S. PATENT DOCUMENTS

| | | | |
|---|---|---|---|
| 2,806,351 | 9/1957 | Kent et al. | 60/39.14 |
| 2,854,817 | 10/1958 | Kuzmitz | 60/39.14 |
| 2,874,766 | 2/1959 | Tyler | 60/39.281 |
| 2,916,875 | 12/1959 | Morley et al. | 60/39.281 |
| 2,932,946 | 4/1960 | Smedley et al. | 60/39.281 |
| 2,949,007 | 8/1960 | Aldrich et al. | 60/35.6 |
| 3,017,745 | 1/1962 | Shirley et al. | 60/35.6 |
| 3,028,729 | 4/1962 | Ledwith | 60/35.6 |
| 3,060,998 | 10/1962 | Bell et al. | 60/39.281 |
| 3,077,073 | 2/1963 | Kuhrt | 60/35.6 |
| 3,593,736 | 7/1971 | White | 137/110 |
| 3,946,551 | 3/1976 | Linebrink et al. | 60/39.28 R |
| 4,077,746 | 3/1978 | Reynolds | 417/225 |
| 4,205,945 | 6/1980 | Davis | 417/245 |

Primary Examiner—Louis J. Caseregola
Attorney, Agent, or Firm—Wood, Dalton, Phillips, Mason & Rowe

[57] ABSTRACT

The use of a single main centrifugal fuel pump for supplying fuel to an aircraft gas turbine engine has advantages over other known systems, however a problem has existed in that the centrifugal pump, when driven in a fixed ratio to the engine speed, cannot deliver fuel at adequate pressure under engine starting conditions. The disclosed fuel supply system using a main centrifugal pump overcomes this shortcoming by having a turbine-driven start pump added to the fuel supply with both the turbine and the start pump receiving fuel pumped by the main centrifugal pump and the turbine utiliziing the high flow, low pressure fuel to drive the start pump which incresases the pressure of the fuel to a value adequate for engine starting. The start pump delivers fuel until such time as the main centrifugal fuel pump has reached a speed to provide the fuel to the engine at the required pressure, at which time the turbine is no longer driven and the output of the start pump goes to zero.

10 Claims, 2 Drawing Sheets

FUEL SUPPLY SYSTEM WITH TURBINE DRIVEN START PUMP

FIELD OF THE INVENTION

This invention relates to a system for boosting the pressure of fluid supplied by a main centrifugal pump and, more particularly, to a fuel supply system for a gas turbine engine having nozzles which require the delivery of fuel above a pressure that can be provided by the main centrifugal pump upon engine start-up when the main centrifugal pump is driven in a fixed ratio to engine speed. The fuel supply system has a turbine-driven start pump, with the turbine being hydraulically powered by low pressure fuel supplied at a high flow rate by the main centrifugal pump. The start pump is supplied with low pressure fuel from the main centrifugal pump and increases the pressure of fuel which is returned to a delivery line supplying the gas turbine engine. The turbine-driven start pump assures adequate pressure of the fuel delivered to the gas turbine engine for starting thereof and, when the gas turbine engine reaches idle, the main centrifugal pump driven thereby is operated at a sufficient speed to provide fuel at an adequate pressure and fuel flow to the turbine is discontinued to discontinue operation of the start pump.

BACKGROUND OF THE INVENTION

Systems for supplying fuel to gas turbine engines have used positive displacement or multiple pump systems. A recognized improvement to such fuel delivery systems is the use of a single main centrifugal fuel pump because of the simplicity of the pump, a resulting lower weight system and improved reliability, all of which are important for fuel supply to aircraft gas turbine engines. When the centrifugal pump is driven in a fixed ratio to the speed of the engine, a problem arises in that the centrifugal pump, at a relatively low speed, will deliver a substantial flow of fuel, but the delivered fuel is not at adequate pressure to achieve engine nozzle pressure for engine-starting and running conditions.

Proposed solutions for delivering fuel to the engine at start-up have included the use of an intermittent duty pump, either mechanically driven through some type of decoupling mechanism, such as a clutch, or an electric motor, so that the intermittent duty pump can be effectively removed from the system by declutching the drive or switching off the motor. These solutions have disadvantages in that the system is increased in complexity with resulting reduction in overall reliability because of the additional power source and the mechanisms required. It is also known to have a charged accumulator in the system which can discharge fuel at an increased pressure upon start-up.

Adequate pressure could be delivered by increasing the size of a centrifugal pump but this would provide excess fuel flow and waste of power.

SUMMARY OF THE INVENTION

A primary feature of the invention is to provide a system for boosting the pressure of fluid supplied by a centrifugal pump by means including a turbine-driven start pump operable only under certain conditions that utilizes hydraulic power available from the centrifugal pump output at a relatively low pressure and high flow rate to a higher pressure at a lower flow rate to provide a fluid supply at a higher pressure.

In a specific embodiment of the invention, a main centrifugal pump normally provides fuel to a gas turbine engine. Upon start-up of the engine, a start pump, driven by a turbine, both of which are connected to the outlet of the main centrifugal pump utilize flow from the centrifugal pump to increase fuel pressure delivered to the engine to meet the fuel pressure requirements for engine starting conditions.

In carrying out the foregoing, the fuel supply system has a main centrifugal fuel pump with an outlet connected to a fuel delivery line for an engine, such as a gas turbine engine, a check valve in the fuel delivery line prevents reverse flow to the main centrifugal fuel pump, a start pump has an outlet connected to the fuel delivery line downstream of the check valve, a turbine is drivingly-connected to the start pump with each of the start pump and turbine having an inlet in flow communication with the outlet of the main centrifugal pump whereby, upon engine start-up, fuel delivered by the main centrifugal fuel pump, which is at a relatively low pressure and a high flow rate, drives the turbine to have the start pump increase the pressure of fuel which is delivered to the fuel delivery line.

The turbine and start pump operation are controlled to discontinue operation thereof when the centrifugal pump has reached a speed whereby pressure of fuel delivered thereby is at a level required for engine operation. It is a characteristic of a centrifugal pump that fluid flow is proportional to speed of the pump while the pressure of the fluid delivered is proportional to the square of pump speed. The turbine-driven start pump functions to utilize centrifugal pump flow to increase pressure of the fuel until such time as the speed of the centrifugal pump is sufficient to supply the fuel to the engine at the required pressure.

An object of the invention is to provide a system for boosting the pressure of fluid supplied by a main centrifugal pump having an outlet connected to a delivery line, comprising a check valve in the delivery line preventing reverse flow to the main centrifugal pump, a second pump having an outlet connected to the delivery line downstream of the check valve, and a turbine drivingly-connected to the second pump, each of said second pump and turbine having an inlet in flow communication with the outlet of the main centrifugal fuel pump.

Still another object of the invention is to provide a fuel supply system for a gas turbine engine comprising, a centrifugal pump, a delivery line connected to the outlet of the centrifugal pump for delivering fuel to a gas turbine engine, and means operable only upon start-up of the gas turbine engine and powered by flow of fuel being pumped by the centrifugal pump for receiving fuel pumped by the centrifugal pump and increasing the pressure thereof and returning said fuel to said delivery line.

A further object of the invention is to provide a fuel supply system for supplying fuel to an engine and having a main centrifugal fuel pump with an outlet connected to a fuel delivery line for the engine, the improvement comprising a check valve in the fuel delivery line preventing reverse flow to the main centrifugal fuel pump, a start pump having an outlet connected to the fuel delivery line downstream of the check valve, a turbine drivingly-connected to the start pump, each of said start pump and turbine having an inlet in flow communication with the outlet of the main centrifugal fuel pump, and means responsive to the pressure of fuel supplied by the main centrifugal fuel pump to control the operation of the turbine.

An additional object of the invention is to provide a fuel supply system as defined in the preceding paragraph wherein the means responsive to the pressure of fuel supplied by the main centrifugal fuel pump to control operation of the turbine comprises a normally-open valve connected to control fuel flow through the turbine.

DESCRIPTION OF THE PREFERRED EMBODIMENT

Figure 1:
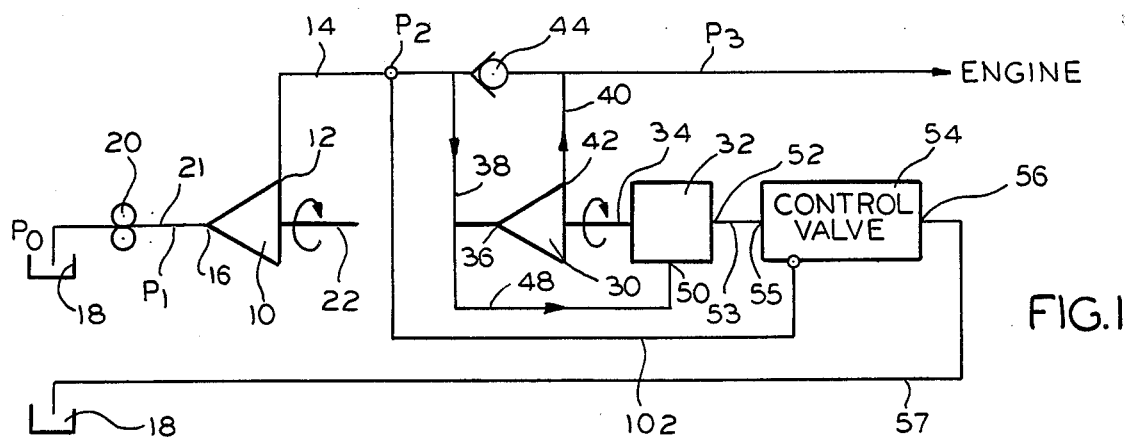
FIG. 1 is a schematic of the fuel supply system.

The fuel supply system is illustrated in FIG. 1 wherein a main centrifugal pump 10 has an outlet 12 connected to a fuel delivery line 14 for delivering fuel to a gas turbine engine (not shown). The main centrifugal pump 10 has an inlet 16 supplied with fuel from a tank 18 by means of a boost pump 20 and a line 21. A drive shaft 22 for the main centrifugal pump is drivingly connected to the gas turbine engine, as known in the art, and an engine start system can be connected into the drive connections to drive the main centrifugal pump and the gas turbine engine with disconnection of the engine start mechanism when the gas turbine engine reaches idle speed.

A centrifugal pump delivers fluid at a flow rate proportional to speed and at a pressure proportional to the square of the speed. The main centrifugal pump 10, at engine start-up, is normally operating in the range of 10-20% of rated speed and cannot deliver the fuel at the necessary pressure required for operation of the gas turbine engine.

The fuel supply system disclosed in FIG. 1 has a start pump, in the form of a centrifugal pump 30, which is driven by a turbine 32 through a connecting shaft 34 for increasing the pressure of fuel supplied to the engine through the delivery line 14. This operation is achieved by the start pump 30 having an inlet 36 connected by a start pump supply line 38 to the delivery line 14 to receive fuel delivered by the main centrifugal pump 10 and return the fuel at a higher pressure to the delivery line 14 by connection of a return line 40 to a start pump outlet 42. The connection of return line 40 to the delivery line 14 is downstream of a check valve 44 in the delivery line, with the check valve being closed so long as the pressure in return line 40 is higher than the pressure of fuel deliverd by the main centrifugal pump 10.

The fuel turbine 32 is driven by fuel delivered by the main centrifugal pump. A line 48 connected to the start pump supply line 38 connects to an inlet 50 of the fuel turbine.

A fuel turbine outlet 52 is connected by a line 53 to a port 55 of a control valve 54. The control valve 54, more particularly described hereinafter, functions to control the rate of fuel flow through the turbine and is normally open whereby fuel flowing from the turbine can return to tank 18 by a valve port 56 connected to a line 57. When the control valve 54 is closed, there is no flow of fuel through the turbine, with resulting nonrotation of the turbine and the start pump 30. The control valve is closed when pressure of fuel delivered by the main pump 10 is sufficient to provide fuel at proper nozzle pressure for proper operation of the gas turbine engine. The control valve may be placed in a different location, as subsequently described.

Figure 4:
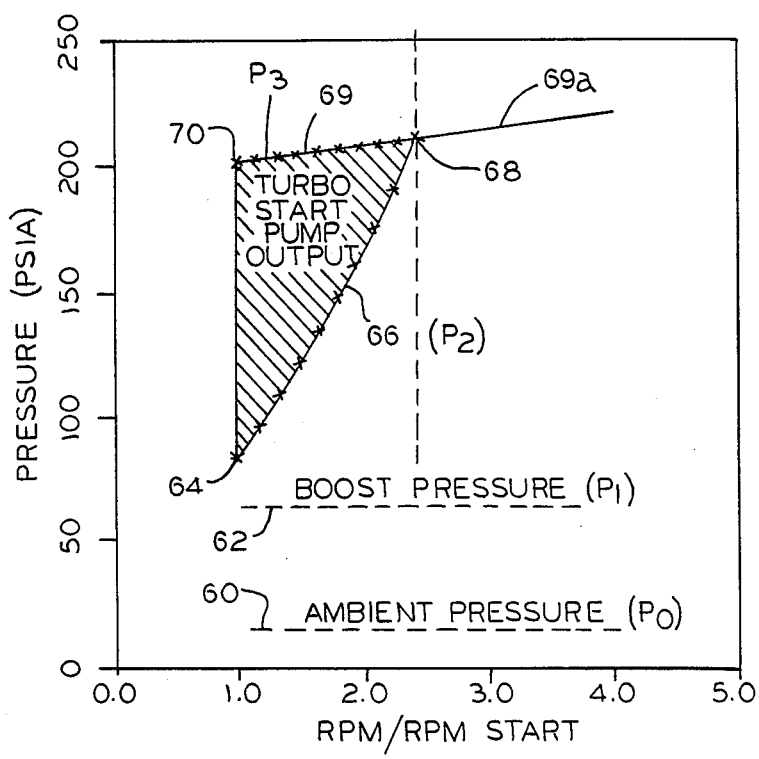
FIG. 4 is a graph illustrating the performance characteristics of the fuel supply system.

The operation and performance characteristics of the fuel supply system are clearly illustrated in FIG. 4, with fuel pressure shown in relation to the speed of rotation of the main centrifugal pump 10. The values given are merely for illustrative purposes. For reference purposes, fuel ambient pressure $P_O$ as it exists in the tank 18, is shown as a broken line 60 and fuel pressure $P_1$ as delivered by the boost pump 20 to the main centrifugal pump 10 is identified by a broken line 62.

With engine starting being initiated at approximately 20% of maximum thrust engine speed, the main centrifugal pump delivers fuel at a pressure $P_2$, identified at point 64. As the speed of the main centrifugal pump 10 increases, the pressure of fuel supplied by the main centrifugal pump increases, as indicated by the sloped line 66 until reaching a cross-over control point 68. At the cross-over point, the gas turbine engine has reached idle speed and the pressure of fuel delivered by the main centifugal pump, driven in a fixed ratio to the gas turbine engine, is at a pressure $P_3$ which meets the engine fuel pressure requirement $P_3$ and as indicated by a line 69. From points 64 to 68, the fuel pressure $P_2$ delivered by the main centrifugal pump is not adequate for proper operation of the engine. The turbine-driven start pump 30 is operable to increase the fuel pressure at start-up to a point 70 to provide fuel at the engine fuel pressure requirement ($P_3$). As the pressure $P_2$ of fuel delivered by the main centrifugal pump 10 increases along the line 66, as a result of increased speed, the operation of the start pump 30 is gradually reduced so that the line 69, representing $P_3$ is at approximately a constant pressure value. An extension 69a of the line 69 represents pressure $P_3$ beyond the cross-over control point. At the cross-over control point 68, the start pump ceases operation. The increase in pressure provided by the start pump is represented by the shaded area.

The control valve 54 can be connected to control fuel flowing to the turbine 32. However, placing the control valve at turbine discharge results in a turbine discharge back pressure to prevent turbine cavitation when the turbine start pump output pressure is reducing toward zero. This location also enables use of the pressure rise by the boost pump 20 as part of the pressure rise for the delivered fuel.

Figure 3:
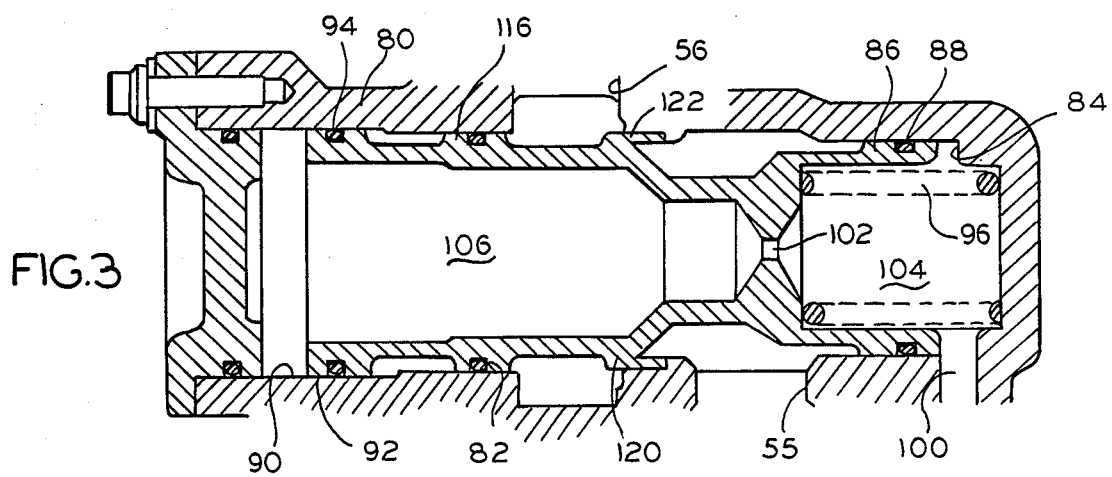
FIG. 3 is a fragmentary central section of the control valve for the fuel turbine.

The control valve 54 is shown in FIG. 3 and has a body 80 with a bore of differing diameters which mounts a multi-diameter valve member 82.

The bore of the valve body 80 has a bore section 84 adjacent one end thereof which movably receives a land 86 of the valve member 82, with a sealing O-ring carried by the valve member. A bore section 90, at the opposite end of the bore, is of a larger diameter than the bore section 84 and receives a correspondingly larger diameter land 92 of the valve member and with there being a sealing O-ring 94 carried by the valve member. The valve member is shown in FIG. 3 in a closed position and is normally urged to an open position to the left of the position shown in the Figure by a spring 96 engageable between an end of the bore and a surface at an end of a chamber 104 formed within the land 86.

Referring to FIGS. 1 and 3, the position of the valve member 82 is controlled by the pressure of the fuel supplied by the main centrifugal pump 10, with this pressure $P_2$ being applied at a port 100 of the valve body 80 through a line 102 which connects into the delivery line 14 intermediate the outlet 12 of the main centrifugal pump and the check valve 44. The pressure $P_2$ is applied against an end of the valve member 82 against an area defined by the diameter of the valve land 86 and is also applied to the opposite end of the valve member across an area represented by the diameter of the land 92 by means of a passage 102 which communicates the spring housing chamber 104 and chamber 106 within the valve body. With the area defined by land 92 being greater than the area defined by the land 86, an increase in the fuel pressure $P_2$ acts to gradually move the valve member to the closed position shown in FIG. 3 with the closure being complete when the fuel pressure reaches point 68 on the graph of FIG. 4.

A valve land 120 with an inclined face coacts with a ring 122 fitted in the bore to control the flow from the turbine 32 to the port 55 of the valve and to line 57 and tank 18 through the port 56. The control valve provides a regulated turbine exhaust pressure $P_R$. In order to exert a bias to maintain the turbine delta P which would normally reduce as exhaust pressure $P_R$ and ambient pressure $P_O$ increase, the required pressure $P_R$ and ambient pressure $P_O$ are caused to act on areas of the valve member at opposite sides of the land 120. The ambient tank pressure $P_O$ acts on a differential area resulting from a land 116 being of a greater diameter than the land 120 and the regulated turbine exhaust pressure $P_R$ acts on an area at the right side of the land 120, as viewed in FIG. 3, defined by the outer diameter of land 86 and a diameter where the land 120 closes on its seat. As $P_O$ goes up, the restraint on spring 96 is reduced. As $P_R$ goes up, the delta P across the turbine decreases.

Figure 2:
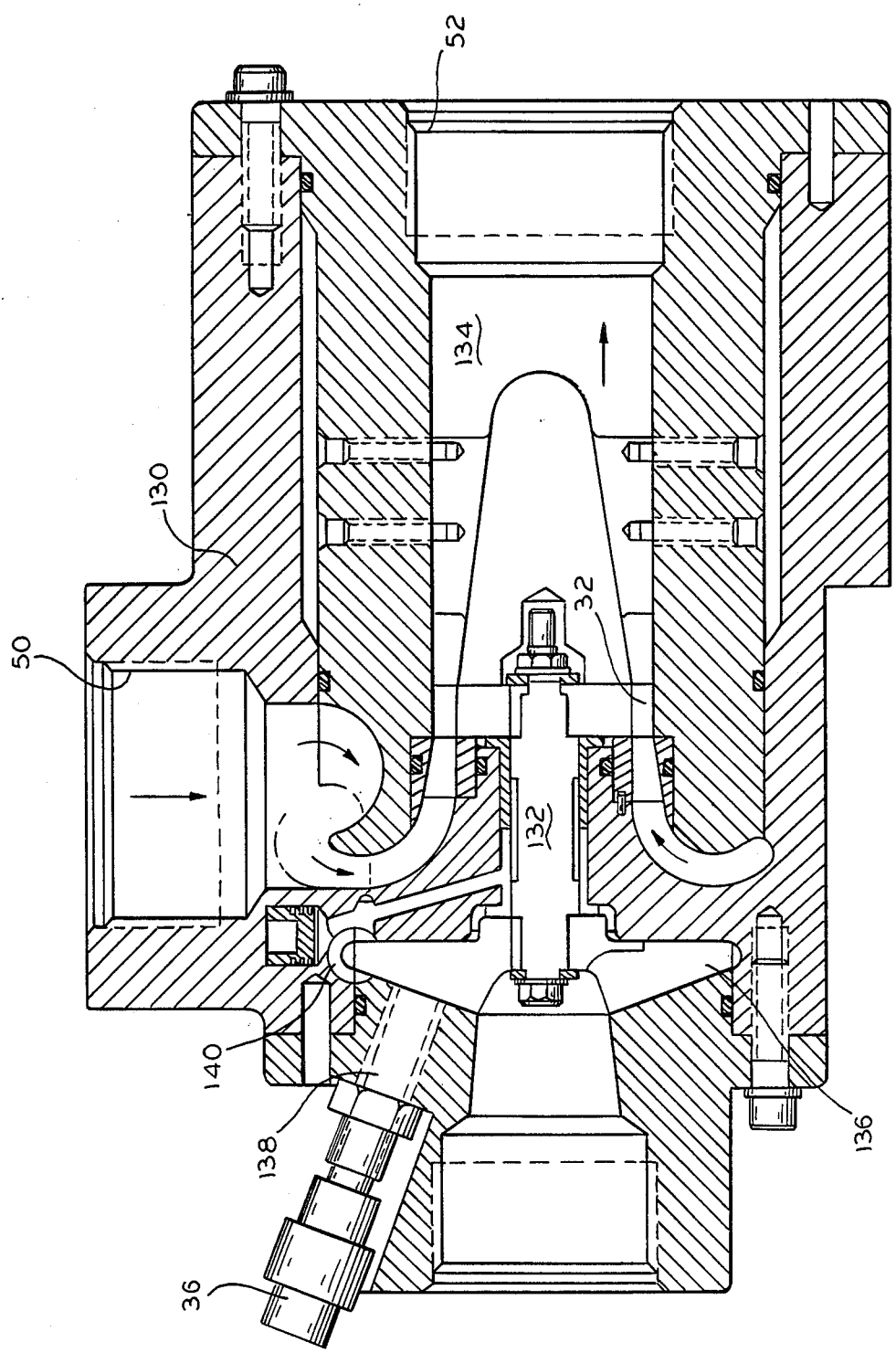
FIG. 2 is a central vertical section of the fuel turbine-driven start pump.

The turbine-driven start pump is shown in a structural embodiment thereof in FIG. 2. The structure has a case 130 which rotatably mounts a shaft 132 having the turbine 32 which is supplied with fuel pumped by the main centrifugal fuel pump 10 through the port 50. Fuel flow in the direction of the arrows drives the turbine and with the turbine-driving fuel flow leaving a central passage in the case through the outlet 52 which connects to the line 53. Rotation of the turbine causes an impeller 136 of the start pump 30, which is on the shaft 132, to rotate whereby fuel from line 38 entering the inlet 36 flows through a passage 138 to the impeller 136. Fuel is pumped by the impeller 136 to a collector 140 for flow to the outlet 42 of the start pump for return to the fuel delivery line 14 through line 40.

From the foregoing, it is believed that the operation of the fuel supply system will be readily understood. In summary, at a start point, as indicated by point 64 in the graph of FIG. 4, there is substantial fuel flow delivered by the main centrifugal pump 10. However, this fuel is at a relatively low pressure. At the start point, the pressure output of the start pump 30 is at a maximum so that the engine fuel pressure requirement $P_3$ is met because the actual pressure of the fuel delivered is at point 70. At this time, the valve member 82 of the control valve 54 is fully open because the motive pressure $P_2$ is at a minimum. The pressure output of the start pump 30 is at a maximum because the large flow delivered by the main centrifugal fuel pump 10 to the turbine causes maximum speed operation of the start pump. As the speed of the main centrifugal pump increases in an acceleration mode, the motive pressure $P_2$ is increasing and, as a result, the control valve 54 is gradually closing and the output of the start pump is steadily decreasing. At the control cross-over point 68, the control valve is essentially closed and the turbine is no longer driven so that the output of the start pump 30 goes to zero. Beyond the cross-over control point 68, the main centrifugal fuel pump 10 is the sole source of fuel under pressure.

I claim:

1. A fuel supply system for a gas turbine engine comprising, a centrifugal pump, a delivery line connected to the outlet of the centrifugal pump for delivering fuel to a gas turbine engine, and means operable only upon engine start-up and powered by flow of fuel pumped by the centrifugal pump for receiving fuel pumped by the centrifugal pump and increasing the pressure thereof and returning said fuel to said delivery line.

2. A fuel supply system as defined in claim 1 including a check valve in said delivery line, and said means operable upon engine start-up includes a pump having an outlet connected into said delivery line downstream of said check valve.

3. A fuel supply system as defined in claim 1 wherein said means operable upon engine start-up comprises a second pump having an inlet receiving part of the fuel pumped by said centrifugal pump.

4. A fuel supply system as defined in claim 3 including a turbine connected to the second pump and operable by fuel flow from the centrifugal pump.

5. A fuel supply system as defined in claim 4 including a control valve for controlling fuel flow through said turbine.

6. A fuel supply system as defined in claim 5 wherein said control valve has pressure-responsive means for stopping fuel flow through said turbine when the centrifugal pump reaches a speed to deliver fuel at the desired pressure.

7. A fuel supply system for supplying fuel to an engine and having a main centrifugal fuel pump with an outlet connected to a fuel delivery line for the engine, the improvement comprising a check valve in the fuel delivery line preventing reverse flow to the main centrifugal fuel pump, a start pump having an outlet connected to the fuel delivery line downstream of the check valve, a turbine drivingly-connected to the start pump, each of said start pump and turbine having an inlet in flow communication with the outlet of the main centrifugal fuel pump, and means responsive to the pressure of fuel supplied by the main centrifugal fuel pump to control the operation of the turbine.

8. A fuel supply system as defined in claim 7 wherein said means for controlling operation of the turbine comprises a normally open valve.

9. A fuel supply system as defined in claim 7 including a boost pump connected to the inlet of said main centrifugal pump.

10. A fuel supply system as defined in claim 9 wherein said means for controlling operation of the turbine comprises a valve connected to the outlet of the turbine, said valve being normally open and closing to stop flow from the turbine when the main centrifugal fuel pump reaches a speed adequate to deliver fuel at the desired pressure.

* * * * *